(12) United States Patent
Takeshima et al.

(10) Patent No.: US 8,206,671 B2
(45) Date of Patent: Jun. 26, 2012

(54) POROUS COMPOSITE OXIDE AND PRODUCTION METHOD THEREOF

(75) Inventors: Shinichi Takeshima, Numazu (JP); Kohei Yoshida, Susono (JP); Akio Koyama, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 145 days.

(21) Appl. No.: 12/457,034

(22) Filed: May 29, 2009

(65) Prior Publication Data

US 2009/0297421 A1 Dec. 3, 2009

Related U.S. Application Data

(62) Division of application No. 10/848,123, filed on May 19, 2004, now Pat. No. 7,604,789.

(30) Foreign Application Priority Data

May 21, 2003 (JP) .................................. 2003-143312
May 23, 2003 (JP) .................................. 2003-146485

(51) Int. Cl.
*C01G 25/02* (2006.01)
(52) U.S. Cl. ........................................ 423/263; 502/304
(58) Field of Classification Search .................... 423/71, 423/263, 92, 93, 385, 592.1, 593.1, 594.12, 423/602, 608, 617; 502/300, 302, 304, 349; 501/103
See application file for complete search history.

(56) References Cited

U.S. PATENT DOCUMENTS

| 5,023,071 | A | 6/1991 | Sherif |
| 5,242,674 | A | 9/1993 | Bruno et al. |
| 5,670,088 | A | 9/1997 | Chittofrati et al. |
| 5,863,850 | A | 1/1999 | Nawa et al. |
| 6,083,467 | A | 7/2000 | Takeshima et al. |
| 6,511,642 | B1 | 1/2003 | Hatanaka et al. |
| 6,933,259 | B2 | 8/2005 | Hatanaka et al. |
| 7,780,943 | B2 * | 8/2010 | Takeshima ................. 423/593.1 |
| 7,820,136 | B2 * | 10/2010 | Takeshima ................. 423/592.1 |
| 2002/0049137 | A1 | 4/2002 | Morikawa et al. |
| 2002/0061816 | A1 | 5/2002 | Uenishi et al. |
| 2002/0110519 | A1 * | 8/2002 | Ying et al. .................... 423/600 |

(Continued)

FOREIGN PATENT DOCUMENTS

EP 1 452 483 A1 9/2004
(Continued)

OTHER PUBLICATIONS

Potdar et al. "Preparation of ceria-zirconia ($Ce_{0.75}Zr_{0.25}O_2$) powders by microwave-hyrothermal (MH) route", *Material Chemistry and Physical*, vol. 74, pp. 306-312, 2002.

(Continued)

*Primary Examiner* — Stanley Silverman
*Assistant Examiner* — Justin Bova
(74) *Attorney, Agent, or Firm* — Oliff & Berridge, PLC

(57) ABSTRACT

The present invention provides a porous composite oxide comprising an aggregate of secondary particles in the form of aggregates of primary particles of a composite oxide containing two or more types of metal elements, and having mesopores having a pore diameter of 2-100 nm between the secondary particles; wherein, the percentage of the mesopores between the secondary particles having a diameter of 10 nm or more is 10% or more of the total mesopore volume after firing for 5 hours at 600° C. in an oxygen atmosphere.

14 Claims, 5 Drawing Sheets

U.S. PATENT DOCUMENTS

2002/0132732 A1    9/2002    Brezny et al.

FOREIGN PATENT DOCUMENTS

| JP | A-02-175602 | 7/1990 |
| JP | A-7-246343 | 9/1995 |
| JP | A-9-86901 | 3/1997 |
| JP | A-10-216517 | 8/1998 |
| JP | A 2001-170487 | 6/2001 |
| JP | A-2002-211908 | 7/2002 |
| JP | A 2002-220228 | 8/2002 |
| WO | WO 95/18068 | 6/1995 |
| WO | WO 02/094716 A1 | 11/2002 |

OTHER PUBLICATIONS

Masui et al., "Characterization and Catalytic Properties of $CeO_2$-$ZrO_2$ Ultrafine Particles Prepared by the Microemulsion Method," Journal of Alloys and Compounds, vol. 269, pp. 116-122, 1998.

* cited by examiner

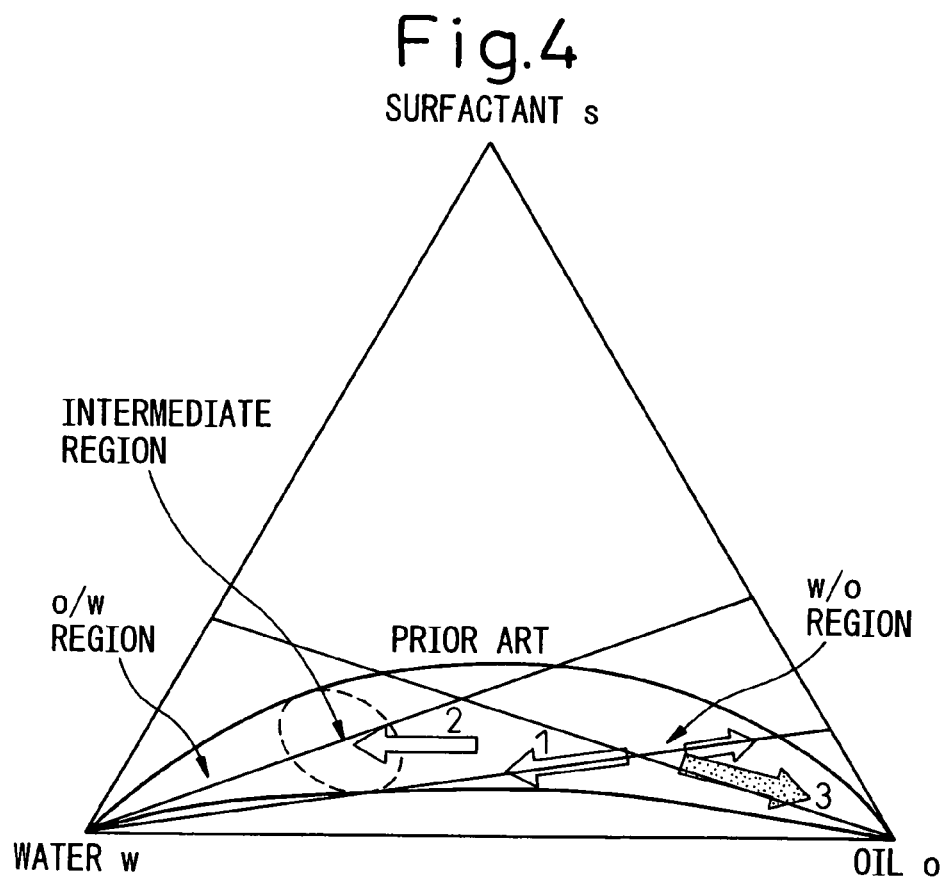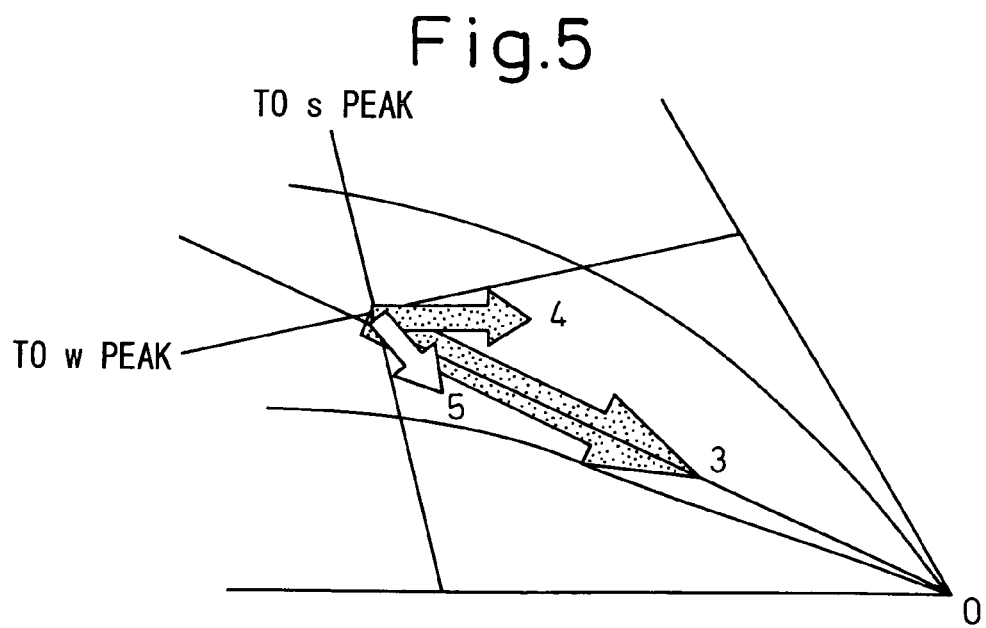

POROUS COMPOSITE OXIDE AND PRODUCTION METHOD THEREOF

This is a Division of application Ser. No, 10/848,123, now U.S. Pat. No. 7,604,789, filed May 19, 2004, which claims priority to Japanese Patent Application No. 2003-143312 filed May 21, 2003 and Japanese Patent Application No. 2003-146485 filed May 23, 2003. The disclosures of the prior applications are hereby incorporated by reference herein in their entireties.

BACKGROUND OF THE INVENTION

1. Field of the Invention

The present invention relates to a porous composite oxide and a production method. More particularly, the present invention relates to a porous composite oxide, which has pores of adequate size even after firing at a high temperature, and a production method.

2. Description of the Related Art

Composite oxides refer to oxides of a form in which two or more types of metal oxides have been formed into a compound, and which ions of oxoacids are not present as structural units. One important application of composite oxides is in catalysts and catalyst supports, and a particularly important application is known to be as a catalyst for exhaust gas purification of internal combustion engines.

For example, a cerium-zirconium composite oxide has been proposed for use as the support of a three-way catalyst (see, for example, Japanese Unexamined Patent Publication No. 2002-220228). Three-way catalysts purify the exhaust gas of internal combustion engines by simultaneously performing oxidation of hydrocarbons (HC) and carbon monoxide (CO) and reduction of nitrogen oxides (NOx) contained in the exhaust gas, and cerium oxide is added to these three-way catalysts because it has an oxygen storage capacity (abbreviated as OSC) in which it is able store oxygen in an oxidizing atmosphere and release oxygen in a reducing atmosphere. However, when three-way catalysts, which contain a metal catalyst and cerium oxide, are used at high temperatures above 800° C., as the OSC decreases due to crystal growth of the cerium oxide, zirconium oxide is added to the cerium oxide to maintain a high OSC by suppressing the crystal growth of the cerium oxide, thereby resulting in the formation of a cerium-zirconium composite oxide.

In addition, the use of a composite oxide composed of two or more types of alumina, zirconia, titania, iron oxide, ceria and magnesia as a support for an NOx occlusion-reduction catalyst (see, for example, Japanese Unexamined Patent Publication No. 2001-170487) is common.

Typical known examples of production methods for composite oxide powder include a simultaneous powder firing method in which a powder of each metal oxide or its precursor such as a carbonate or a hydroxide are mixed and fired, a co-precipitation method in which alkali is added to an aqueous solution of a plurality of metal inorganic salts to neutralize the solution and form a colloidal dispersion of oxide or hydroxide, and an alkoxide method in which water is added to a plurality of metal alkoxides dissolved in an organic solvent to hydrolyze the metal alkoxides.

In the powder simultaneous firing method, there are limitations on the fineness of the powder, and firing at a high temperature is necessary to obtain a composite oxide from the powder. In the case of high-temperature firing, grain growth occurs and surface area decreases. It is actually therefore quite difficult to obtain a fine powder of a composite oxide having a high surface area and completely homogeneous at the atomic level. The co-precipitation method utilizes the neutralization precipitation reactions of a plurality of inorganic ions in an aqueous solution, and although the particle diameter of the resulting colloidal particles is fine, as the precipitation reaction of each inorganic ion is dependent on pH, individual colloidal particles tend to become particles of respective independent metal oxides or metal hydroxides, thereby preventing the formation of composite oxides that are uniformly mixed at the atomic level. Although conventional alkoxide methods have used the hydrolysis of a plurality of metal alkoxides in organic solvent, as the stability and hydrolysis reaction rate varies according to the type of metal alkoxide, there is an order of priority by which oxides are formed between metals, which also prevents the formation of composite oxides uniformly mixed at the atomic level.

In addition, although conventional methods employ pore control for their resulting composite oxides, they typically have a pore size distribution consisting mainly of small pores having a particle diameter of about 2-7 nm. In addition, as conventional composite oxides are composed of aggregates of primary particles and have small pores between the primary particles, in the case sintering has progressed at high temperatures, sintering progresses between these primary particles causing the crystals to atrophy overall and pore volume to decrease considerably.

In the invention described in the aforementioned Japanese Unexamined Patent Publication No. 2002-220228, although the pores of the support are 2-100 nm, this basically consists of merely increasing the pore volume between primary particles, and as a result, as sintering progresses between the primary particles, the crystals atrophy overall and pore volume decreases.

SUMMARY OF THE INVENTION

Thus, an object of the present invention is to provide a composite oxide in which the metal that composes the composite oxide is uniformly distributed, and there is no occurrence of a decrease in pore volume, and particularly the volume of mesopores having a pore diameter of 10 nm or more, or a decrease in performance even if fired at high temperatures. Moreover, another object of the present invention is to provide a novel production method of a composite oxide that enables the production of composite oxide in which metal ions (elements) are uniformly mixed at the atomic level and for which there is minimal thermal degradation even after high-temperature firing.

In order to achieve the aforementioned object, according to a first aspect of the present invention, the present invention provides a porous composite oxide that is composed of an aggregate of secondary particles in the form of aggregates of primary particles of a composite oxide containing two or more types of metal elements, and has mesopores having a pore diameter of 2-100 nm between the secondary particles; wherein, the percentage of the mesopores between the secondary particles having a diameter of 10 nm or more is 10% or more of the total mesopore volume after firing for 5 hours at 600° C. in an oxygen atmosphere.

In the aforementioned porous composite oxide of the present invention, the particle diameter of the primary particles is preferably 3-15 nm, the particle diameter of the secondary particles is preferably 30-100 nm, and the metal elements are preferably composed of the two types of cerium and zirconium.

According to a second aspect of the present invention, a production method of the aforementioned porous composite oxide comprises: a solution in which a first metal element compound that forms a hydroxide by hydrolysis is dissolved in organic solvent, and an emulsion containing a second or other metal element ion in an aqueous phase within reverse micelles formed by a surfactant in organic solvent, are mixed, the first metal element compound is hydrolyzed at the interface of the reverse micelles together with incorporating the second or other metal element to form primary particles of a precursor of a composite oxide by polycondensation, and in a system containing these primary particles, the primary particles are aggregated to form secondary particles, and the secondary particles are aggregated; wherein, the volume of the organic phase outside the reverse micelles is made to be larger than the volume of the aqueous phase inside the reverse micelles and the volume of the surfactant so that pores of an adequate size are formed between the secondary particles while maintaining an adequate distance between the reverse micelles during hydrolysis.

In the aforementioned second aspect, the volume of the organic phase outside the reverse micelles is preferably two or more times the volume of the aqueous phase inside the reverse micelles, the volume of the organic phase outside the reverse micelles is preferably 5 or more times the volume of the surfactant, the diameter of the aqueous phase inside the reverse micelles is preferably 5 mm or more, and the distance between the reverse micelles is preferably 20 nm or more.

According to a third aspect of the present invention, a production method of the aforementioned porous composite oxide comprises: a solution in which a first metal element compound that forms a hydroxide by hydrolysis is dissolved in organic solvent, and an emulsion containing a second or other metal element ion in an aqueous phase within reverse micelles formed by a surfactant in organic solvent, are mixed, the first metal element compound is hydrolyzed at the interface of the reverse micelles together with incorporating the second or other metal element to form primary particles of a precursor of a composite oxide by polycondensation, and in a system containing these primary particles, the primary particles are aggregated to form secondary particles, and the secondary particles are aggregated; wherein, the volume of the organic phase outside the reverse micelles is made to be larger than the volume of the aqueous phase inside the reverse micelles and the volume of the surfactant so that pores of an adequate size are formed between the secondary particles while maintaining an adequate distance between the reverse micelles during hydrolysis, and the pH is adjusted to determine the size of the secondary particles during formation of the primary particles at the interface of the reverse micelles.

In the aforementioned third aspect, the pH that determines the size of the secondary particles preferably uses a pH value shifted by 1-3 from the isoelectric point, the diameter of the aqueous phase of the reverse micelles is preferably 2-40 nm, and the distance between the reverse micelles is preferably 20 nm or more, and an organic compound is preferably a metal alkoxide or acetonato metal complex, and the ion of the second or third or other element is preferably that of an inorganic acid metal salt.

According to a fourth aspect of the present invention, a production method of the aforementioned porous composite oxide comprises: an aqueous solution containing a first metal element ion and an aqueous solution containing a second or other metal element ion are mixed and allowed to react in an aqueous phase inside reverse micelles formed by a surfactant in organic solvent, a compound containing the first metal and second or other metal elements is allowed to precipitate, this is then hydrolyzed to form primary particles of a precursor of a composite oxide by polycondensation, and in a system containing these primary particles, the primary particles are aggregated to form secondary particles, and the secondary particles are aggregated; wherein, the volume of the organic phase outside the reverse micelles is made to be larger than the volume of the aqueous phase inside the reverse micelles and the volume of the surfactant so that pores of an adequate size are formed between the secondary particles while maintaining an adequate distance between the reverse micelles during hydrolysis.

In the aforementioned fourth aspect, the volume of the organic phase outside the reverse micelles is preferably two or more times the volume of the aqueous phase inside the reverse micelles, the volume of the organic phase outside the reverse micelles is preferably five or more times the volume of the surfactant, the diameter of the aqueous phase inside the reverse micelles is preferably 5 nm or more, and the distance between the reverse micelles is preferably 20 nm or more.

According to a fifth aspect of the present invention, a production method of the aforementioned porous composite oxide comprises: an aqueous solution containing a first metal element ion and an aqueous solution containing a second or other metal element ion are mixed and allowed to react, the mixture containing the first metal and the second or other metal element is allowed to precipitate, this is then hydrolyzed to form primary particles of a precursor of composite oxide by polycondensation, and in a system containing these primary particles, the primary particles are aggregated to form secondary particles, and the secondary particles are aggregated; wherein, a compound is precipitated by making the total metal element ion concentration in the mixture of the aqueous solution containing ions of a first metal element and the aqueous solution containing ions of a second or other metal element to be 0.3 mol/L or less, after which a solution containing this precipitate is concentrated to aggregate secondary particles.

BRIEF DESCRIPTION OF THE DRAWINGS

FIG. 4 is a three-phase map showing the relationship between the water, surfactant and oil in a microemulsion.

FIG. 5 is a partially enlarged view of FIG. 4.

DESCRIPTION OF THE PREFERRED EMBODIMENT

Figure 1:
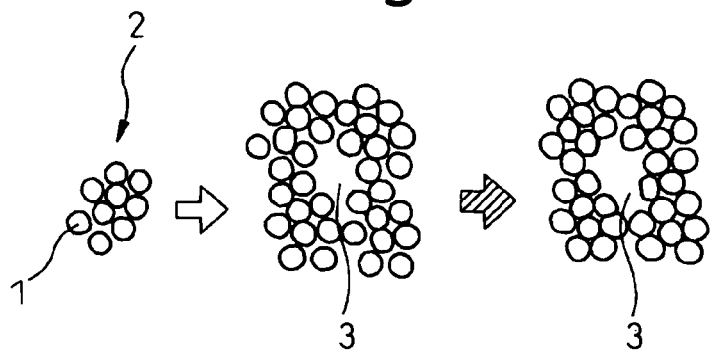
FIG. 1 is a drawing showing the composition of a composite metal oxide of the present invention.
Figure 2:
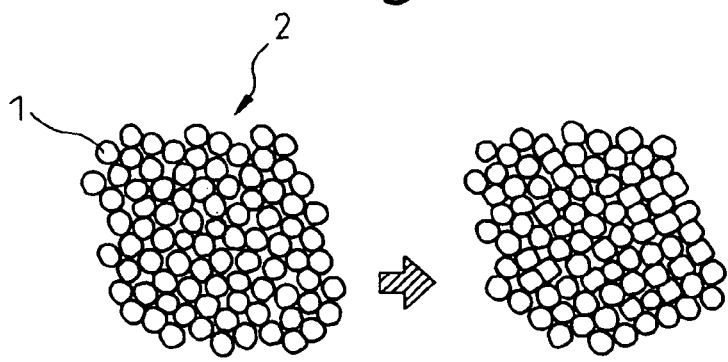
FIG. 2 is a drawing showing the composition of a composite metal oxide of the prior art.

As shown in FIG. 1, the porous composite oxide of the present invention is composed by aggregating secondary particles 2 having a particle diameter of about 100 nm, which are aggregates of primary particles 1 of a composite oxide having a particle diameter of 5-15 nm, and not only has pores between primary particles 1, but also has mesopores 3 having a diameter of 10-100 nm between secondary particles 2. In addition, the porous composite oxide of the present exhibits hardly any change in pore volume as compared with before firing even after firing at a high temperature of 600° C., with pores having a diameter of 10 nm or more accounting for at least 10% of the total pore volume. In contrast, as shown in FIG. 2, although a composite oxide of the prior art is composed of secondary particles 2 which are aggregates of primary particles 1, it is composed of a single large secondary particle overall, pores are not formed between the secondary particles, and pores are only present between the primary particles. When this aggregate is fired at a high temperature, the pore volume decreases and the entire aggregate contracts. Furthermore, in the present specification, pore diameter is the value measured according to the nitrogen adsorption method at the temperature of liquid nitrogen. In addition, pore volume distribution is the value determined in accordance with the BJH method, which is a typical calculation method based on the amount of adsorbed nitrogen relative to nitrogen feed pressure.

A possible reason for the composite oxide of the present invention not exhibiting a decrease in pore volume even when fired at a high temperature in this manner is as described below. Namely, the composite oxide of the present invention differs from a composite oxide of the prior art in that, as shown in FIG. 1, as pores are also present between the secondary particles, there are locations where the bonding state between the primary particles are strong and those where it is weak. Bonding is weak where the pores are large, and clefts widen easily from those locations during firing. On the other hand, as sintering progresses due to high-temperature firing where bonding is strong, pores having a small diameter are crushed while pores having a large diameter increase. As a result, the composite oxide changes overall to that having a large pore diameter without hardly any change in pore volume. In contrast, in the case of a composite oxide of the prior art, as the bonding between primary particles is in a nearly uniform state, sintering progresses all at once due to high-temperature firing. This means a decrease in the volume of the secondary particles, which are aggregates of the primary particles, and a decrease in pore volume. In this manner, in the case of the composite oxide of the present invention, as there are locations where bonding strength differs between the primary particles, decreases in volume caused by sintering between primary particles due to high-temperature firing are suppressed.

There are no particular limitations on the type of porous composite oxide in the present invention provided it is a composite oxide containing at least a first metal element and a second metal element. Composite oxide systems are commonly shown in numerous textbooks and handbooks, and numerous oxides of metal elements that form metal oxides such as alumina, zirconia, ceria, silica, iron oxide, manganese oxide, chromium oxide, yttrium oxide and so forth are nearly always able to form composite oxides by adding a second or other metal element. Whether or not which elements form a composite oxide is also known. The present invention can be applied to all of these composite oxides providing a hydrolytic raw material or inorganic metal salt raw material is present.

An example of such a composite oxide is cerium-zirconium composite oxide. This composite oxide has the crystal structure of zirconium oxide $ZrO_2$, and a portion of the zirconium in this crystal structure is substituted by cerium. In the past, as cerium oxide was loaded onto a support together with a catalyst metal, when the catalyst was used at high temperatures, the oxygen storage capacity (OSC) of the cerium oxide decreased due to crystal growth of the cerium oxide. However, as a result of using cerium in the form of a composite oxide, the decrease in OSC can be suppressed even when used at high temperatures. Moreover, as the composite oxide of the present invention has sufficiently large pores even after firing at high temperatures, it is able to diffuse even HC having a large molecular weight in the manner of HC present in diesel exhaust gas in a support, thereby making it possible to purify the exhaust gas by demonstrating OSC.

In addition, another example is a composite oxide of a rare earth metal such as lanthanum and zirconium. When a portion of the zirconium in the crystal structure of zirconium oxide is substituted with lanthanum, as zirconium is tetravalent while lanthanum is trivalent, oxygen deficits are formed within the crystal lattice where no oxygen is present. When an alkaline metal is added to this composite oxide, electrons are donated to the oxygen deficits. As the oxygen deficits to which electrons have been donated have extremely strong basicity, oxygen deficits to which electrons have been donated compose strongly basic sites. Nitrogen oxide NO present in exhaust gas is captured by these strong basic sites, and as a result, a large amount of nitrogen oxide is adsorbed in this composite oxide. Namely, as this composite oxide has NOx occluding action, it can be used as an NOx occlusion-reduction catalyst. As this lanthanum-zirconium composite oxide has sufficiently large pores even after firing at high temperatures, it is able to rapidly diffuse exhaust gas and improve the efficiency of exhaust gas purification.

Next, an explanation is provided of a production method of the porous composite oxide of the present invention. Although conventional composite oxides are composed of secondary particles which are aggregates of primary particles, in the case of the composite oxide of the present invention, a plurality of comparatively small secondary particles having a size of about 100 nm are first formed from these primary particles, followed by aggregation of these secondary particles. Namely, after forming the primary particles, since these primary particles aggregate overall and end up forming large secondary particles if the concentration of these primary particles in the reaction system is high, in the present invention, as shown in FIG. 1, after forming the primary particles, collisions among the primary particles are suppressed by forming ideal spaces between the primary particles when they are allowed to aggregate, thereby suppressing the aggregation of primary particles overall and resulting in the formation of pores between the secondary particles as a result of first forming comparatively small secondary particles of about 100 nm followed by their aggregation.

A first aspect of a production method of a porous composite oxide of the present invention comprises: a solution in which a compound of a first metal element that forms a hydroxide by hydrolysis is dissolved in organic solvent, and an emulsion containing an ion of a second or other metal element in an aqueous phase within reverse micelles formed by a surfactant in organic solvent, are mixed, the compound of the first metal element is hydrolyzed at the interface of the reverse micelles together with incorporating the second or other metal element to form primary particles of a precursor of a composite oxide by polycondensation, and in a system containing these primary particles, the primary particles are aggregated to form secondary particles, and the secondary particles are aggregated; wherein, the volume of the organic phase outside the reverse micelles is made to be larger than the volume of the aqueous phase inside the reverse micelles and the volume of the surfactant so that pores of an adequate size are formed between the secondary particles while maintaining an adequate distance between the reverse micelles during hydrolysis.

In the present specification, a compound of a first metal element that forms a hydroxide by hydrolysis is referred to as a first metal compound. However, the metal that composes this first metal compound does not refer to a metal in the narrow sense, but rather refers to an element M in general that is capable of forming an M—O—M bond.

Metal compounds that are typically used in the so-called sol gel method can be used for this first metal compound. Examples of these metal compounds include metal alkoxides, acetylacetone metal complexes, metal carboxylates and metal inorganic compounds (such as nitrates, oxychlorides and chlorides).

Although metal elements M that form metal alkoxides include elements of groups 1 through 14, sulfur, selenium and tellurium in group 16, and phosphorous, arsenic, antimony and bismuth in group 15, platinum group elements and some lanthanoid elements reportedly do not form alkoxides. For example, silicon alkoxides and germanium alkoxides are also said to be metal alkoxides. As various types of metal alkoxides are commercially available and their production methods are known, they can be acquired easily.

Hydrolysis reactions of metal alkoxides $M(OR)_n$ (wherein, M represents a metal and R represents an alkyl group such as a methyl, ethyl, propyl or butyl group) are also known, and are formally represented with: $M(OR)_n + nH_2O \rightarrow M(OH)_n + nROH$ followed by $M(OH)_n \rightarrow MO_{n/2} + n/2H_2O$.

Hydrolysis reactions of acetylacetone metal complexes $(CH_3COCH_2COCH_3)_nM$ (wherein, M represents a metal) are also known, and are represented with: $(CH_3COCH_2COCH_3)_nM + nROH \rightarrow nCH_3COCH_2C(OH)CH_3 + M(OH)_n$ followed by $M(OH)_n \rightarrow MO_{n/2} + n/2H_2O$.

Since various types of acetylacetone metal complexes are available commercially and their production methods are known, they can be acquired easily. Typical examples of acetylacetone metal complexes include aluminum acetonato, barium acetonato, lanthanum acetonato and platinum acetonato, and the number of types of these complexes is greater than that of alkoxides.

Organic metal oxides such as metal alkoxides and acetylacetone metal complexes are easily dissolved if a suitable solvent is selected from alcohols, polar organic solvents, hydrocarbon solvents and so forth. Hydrophobic (oily) organic solvents that can be separated into an aqueous phase and a second phase are preferably used for the solvent of the present invention.

Examples of organic solvents include hydrocarbons such as cyclohexane and benzene, and straight chain alcohols such as hexanol. Organic solvent selection standards include surfactant solubility and size of the region that forms a microemulsion (large water/surfactant molar ratio).

When water is added to an organic phase in which a compound of a first metal element, that forms a hydroxide by hydrolysis, is dissolved, the hydrolysis reaction of the organic metal compound is known to begin and progress. In general, a metal hydroxide can be obtained by adding water to an organic phase in which a first metal compound is dissolved followed by stirring.

In the present invention, as a result of forming a water-in-oil emulsion that contains ions of a second or other metal element in an aqueous phase inside reverse micelles in which an aqueous phase has been finely dispersed in an organic phase with surfactant, and adding the aforementioned solution of the first metal compound to this emulsion followed by stirring and mixing, it reacts with ions of the second or other metal element in the aqueous phase surrounded by surfactant within the reverse micelles resulting in hydrolysis. In this method, fine product particles are thought to be obtained as a result of the large number of reverse micelles serving as reaction cores or the fine particles of hydroxide that are formed being stabilized by the surfactant.

In the aforementioned hydrolysis reaction, it is also known that, as a result of dissolving a plurality of hydrolytic metal compounds in an organic phase, during contact with water, the plurality of metal compounds are hydrolyzed and a plurality of metal hydroxides are formed simultaneously.

In the present invention, one type of these hydrolytic metal compounds (compounds containing a first element) is placed in the presence of an organic phase, and during contact between that organic phase and water, a second metal element, as well as a third or other metal element is made to be present as ions in an aqueous phase within reverse micelles.

A water-soluble metal salt and, particularly, an inorganic acid salt such as nitrate or chloride or an organic acid salt such as lactate or oxalate, can be used to cause the metal elements to be present as ions in the aqueous phase. In addition to individual metal ions, the ions of the second element present in the aqueous phase may also be complex ions containing the second element. This applies similarly to ions of the third or other elements.

When the organic phase and aqueous phase make contact, although a hydrolysis reaction occurs resulting in the formation of a hydroxide or oxide of the first metal due to the organic metal compound in the organic phase contacting the water, at this time, according to the present invention, it was found that the metal ions present in the aqueous phase are incorporated within the hydroxide (or oxide) of the first metal that is the hydrolysis product. This phenomenon is not known in the prior art. Although the reason why ions in the aqueous phase are incorporated within hydroxide without having to perform a special precipitation procedure is not fully understood, in explaining this using the example of the case of the first metal compound being an alkoxide, when the alkoxide is hydrolyzed, hydrolysis is thought to proceed as a result of the second metal ions in the aqueous phase giving rise to alkoxide, or the hydrolyzed fine hydroxides of the alkoxide are thought to be captured by a predetermined amount of metal ions in the aqueous phase causing them to aggregate.

According to the present invention, in this novel production method in particular, although ions of a second metal element present in an aqueous phase are incorporated in hydroxide obtained by hydrolysis by a first metal element present in an organic phase, it was found that hydroxide can be obtained in which the first metal element and second or other metal element in the resulting hydroxide are extremely uniformly dispersed, and that the uniformity is remarkably superior compared with the case of the alkoxide method of the prior art, namely causing a plurality of metal alkoxides to be present in an organic phase. A composite oxide (solid solution) was obtained in which the first metal element and the second metal element of the composite oxide after firing are ideally mixed at the atomic level even at a comparatively low firing temperature. This could not be accomplished with the metal alkoxide method of the prior art. In the metal alkoxide method of the prior art, since stability varies according to the type of metal alkoxide, non-uniform products can only be obtained between the first metal element and the second metal element.

The relative ratio of the first metal element and second metal element in a composite oxide obtained according to the present invention can be adjusted by the ratio of the amount of the first metal element in the organic phase and the amount of the second metal element in the aqueous phase.

In the present invention, the reaction system is preferably a water-in-oil emulsion system or a microemulsion system. This is thought to be because, firstly, the hydrolysis reaction rate can be increased since the diameter of the microemulsion is extremely small at several nanometers to just more than ten nanometers, and the interface between the organic phase and aqueous phase is extremely large (roughly 8000 m²/liter in the case of a diameter of 10 nm and, secondly, uniformity is enhanced since the aqueous layer is divided into shells, and only an extremely small number of metal ions (roughly 100) are contained in each shell.

In this sense, the diameter of the aqueous phase within the reverse micelles in a microemulsion is 2-20 nm, preferably 2-15 nm and more preferably 2-10 nm.

Methods for forming a water-in-oil emulsion system or microemulsion system are known. Examples of organic phase solvents that can be used include hydrocarbons such as cyclohexane and benzene, straight chain alcohols such as hexanol and ketones such as acetone in the same manner as the previously mentioned organic solvents. Numerous types of surfactants can be used in the present invention, examples of which include nonionic surfactants, anionic surfactants and cationic surfactants, and they can be used in combination with organic phase components according to the particular application.

Examples of nonionic surfactants that can be used include polyoxyethylene nonylphenyl ether-based surfactants as represented by polyoxyethylene (n=5) nonylphenyl ether, polyoxyethylene octylphenyl ether-based surfactants as represented by polyoxyethylene (n=10) octylphenyl ether, polyoxyethylene alkyl ether-based surfactants as represented by polyoxyethylene (n=7) cetyl ether, and polyoxyethylene sorbitan-based surfactants as represented by polyoxyethylene sorbitan trioleate.

Examples of anionic surfactants that can be used include sodium di-2-ethylene hexylsulfosuccinate, while examples of cationic surfactants that can be used include cetyltrimethyl ammonium chloride and cetyltrimethyl ammonium bromide.

Although a water-in-oil emulsion system or microemulsion system is preferred, the production method of the present invention can also be carried out in an oil-in-water emulsion system as well.

In the present invention, in the case of producing a composite oxide of three or more elements, the third and other elements are present in the aqueous phase within the reverse micelles. This is because a non-uniform product results in an organic phase because there are differences in stability among hydrolytic metal compounds in an organic phase when a plurality of hydrolytic metal compounds are present in an organic phase. Although uniformity is naturally required between a first metal element and a second metal element, if uniformity between the first metal element and a third metal element is not important, the metal compound of the third element may be present in an organic phase.

The reverse micelles that contain ions of the second metal element can be formed by an injection method in which an aforementioned surfactant is dissolved in an aforementioned organic phase solvent, and an aqueous solution containing ions of the second metal element is added followed by stirring.

In this manner, after contacting reverse micelles containing a solution of a first metal compound and ions of a second metal element in an aqueous phase, and forming primary particles of a precursor of a composite oxide containing the first metal element and the second metal element by hydrolysis, the system containing these primary particles is aged by allowing it to stand for a predetermined amount of time (2 hours) at a predetermined temperature (30-80° C.). In this aging step, the primary particles aggregate to form secondary particles. At this time, hydrolysis and aging are carried out while maintaining an adequate distance between the reverse micelles so that instead of all of the primary particles aggregating to form secondary particles, comparatively small secondary particles are first formed followed by the formation of adequately large pores between the secondary particles and aggregation of those secondary particles.

Figure 3:
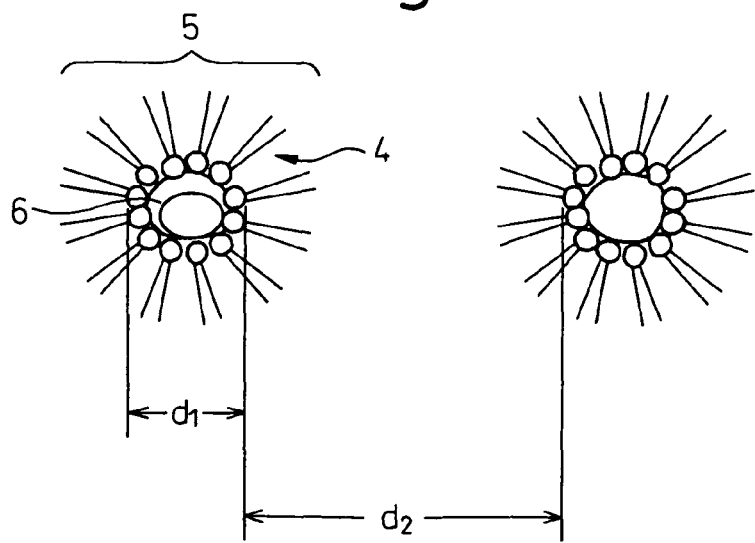
FIG. 3 is a schematic drawing showing the size and distance between reverse micelles in the method of the present invention.

More specifically, as shown in FIG. 3, reverse micelles 5, which are formed by surfactant 4 in which lyophilic groups face the outside and hydrophilic groups face to the inside, are formed and then made to contain ions of a second metal element in aqueous phase 6 inside. Here, the diameter $d_1$ of the water droplets is preferably about 10 nm, and the distance $d_2$ between water droplets is 20 nm or more. Although the reverse micelles are constantly moving and dispersing due to Brownian movement, in the present invention, small secondary particles having a size of about 100 nm are formed by suppressing the aggregation of primary particles so that all of the primary particles do not aggregate and form secondary particles in order to increase the volume of the organic phase relative to the aqueous phase and to maintain an adequate distance between the water droplets, namely the reverse micelles.

In a microemulsion containing reverse micelles, the size of the water droplets and distance between the water droplets of the reverse micelles is determined by three factors consisting of the amount of water, the amount of oil and the amount of surfactant. FIG. 4 shows the regions for using the water, oil and surfactant in a microemulsion. In addition, the following Table 1 shows one example of the effects of water droplet diameter and distance between water droplets of reverse micelles in the three-phase map of FIG. 4.

TABLE 1

Effects of Water Droplet Diameter and Distance Between Water Droplets According to a Three-Phase Map

| Synthesis Conditions | w/s | o/s | o/w | Water droplet diameter (nm) | Distance between water droplets (nm) |
| --- | --- | --- | --- | --- | --- |
| 0 Base | 8.6 | 18 | 2.1 | 16.3 | 19.5 |
| 1 Increased water | 16 | 18 | 1.1 | 18.0 | 14.8 |
| 3 Increased oil | 8.6 | 112 | 13 | 22.4 | 60.5 |
| 4 Increased oil and surfactant | 6.0 | 112 | 19 | 18.6 | 59.0 |
| 5 Increased water and oil | 10 | 56 | 5.5 | 21.0 | 38.6 |

In general, w/o emulsion systems are formed by an injection method in which water is added to a liquid in which surfactant is dissolved in oil followed by stirring. In consideration of this, increasing the molar ratio w/s of water to surfactant (W value) is typically equivalent to increasing the amount of water added. Namely, in the three-phase map shown in FIG. 4, this constitutes movement in direction 1. In this case, the primary particles aggregate to a larger size resulting in larger secondary particles. If water is continued to be added, the synthesis conditions no longer lie in the intermediate region and frequently enter the region of two-phase separation. It is therefore necessary to increase the concentration of surfactant in advance in order for the synthesis conditions to be in an intermediate region that is neither of the w/o type or the o/w type.

Next, in the case of moving in direction 3 in FIG. 4, namely it the amount of oil is increased, the water droplet diameter increases and the distance between water droplets increases considerably. In this case, the w/o microemulsion is rarely destroyed even if a large amount of oil is added, and offers satisfactory controllability as increases in water droplet size and increases in the distance between water droplets can be changed as desired. However, since this is still inadequate from the viewpoint of independently controlling water droplet diameter and distance between water droplets, water droplet diameter and distance between water droplets can be controlled independently by slightly shifting the vectors as shown in FIG. 5.

Namely, as shown in FIG. 5, if the synthesis conditions move in direction 4 by increasing the oil and increasing the concentration of surfactant, the distance between the water droplets can be increased without changing water droplet diameter. In addition, in the case of increasing the amount of solution without changing the concentration of ions in the aqueous phase, namely in the case of causing the synthesis conditions to move in direction 5 by thinning the solution, the water droplet diameter becomes larger while the change in distance between water droplets is comparatively small. However, as both the amounts of water and oil increase relative to surfactant in this region, the region is narrow and excessively sensitive to changes in state depending on map position, thereby requiring precise adjustment.

In the present invention, in order to prevent the formation of large secondary particles, it is necessary to increase only the distance between water droplets without increasing the water droplet diameter of the reverse micelles. As is clear from the aforementioned result, if the ratio of oil to water and surfactant is increased, both water droplet diameter and distance between water droplets increase simultaneously. More specifically, if the volume ratio of oil to water is increased by two times or more, the volume ratio of oil to surfactant should be increased by five times or more.

However, there are cases in which, even if the distance between water droplets of the reverse micelles is increased, aggregation of primary particles continues to progress, the secondary particles become excessively large, or conversely, aggregation of primary particles is inadequate and the secondary particles become excessively small. When the secondary particles have become excessively large, pores in the mesopore range of 2-100 nm cannot be formed even if the secondary particles aggregate, while pores can be formed in the macropore range of 100 nm or more. Conversely, if the secondary particles are excessively small, the same form results when the secondary particles are aggregated as when the primary particles are aggregated directly. Thus, in either case, this results in pores in the mesopore range, which have a significant effect on the catalytic reaction, being unable to increase.

Therefore, in order to control the aggregation of primary particles (namely, the size of the secondary particles), a second aspect of the production method of a porous composite oxide of the present invention adds the following procedure when carrying out the hydrolysis reaction. The pH is adjusted to a pH that is suitably shifted from the isoelectric point of the particles for an initial fixed period of time, after which the pH is adjusted to approach the isoelectric point. Here, the isoelectric point refers to the point at which the surface potential of the formed fine particles becomes zero, and at a pH that has shifted from this point, an electric potential is generated on the surface of the fine particles causing the particles to repel each other. Conversely, the repulsion generated by the electric potential of the particles becomes smaller in the vicinity of the isoelectric point, and the particles proceed to aggregate due to Van der Waal's force.

Although the salt of a metal dissolved in an aqueous phase is typically acidic, there are many cases in which the isoelectric point of a composite oxide precursor (hydroxide) is weakly basic. Consequently, the resulting particles have a large surface (zeta) potential. In such cases, the repulsion between primary particles is large which results in the secondary particles being excessively small.

In the present invention, however, by initially shifting the pH by 1-4 from the isoelectric point during the hydrolysis reaction to create conditions for obtaining a suitable surface potential, the resulting primary particles aggregate and secondary particles are formed having a suitable size. Next, the pH is then made to approach the isoelectric point which causes the secondary particles to aggregate and allows the obtaining of precipitation of composite oxide precursor. Furthermore, although numerous methods are known for determining the isoelectric point, in the system of the present invention, the value determined by electrophoresis using the Laser Doppler technique closely agrees with the actual phenomenon.

Although the direction of the pH adjustment is determined by the relationship between the pH of the initial metal salt solution and the isoelectric point of the composite oxide precursor, in the case it is necessary to shift the pH towards basicity, an aqueous solution of a hydroxide of ammonia or alkaline metal, for example, should be added as base while, conversely, in the case it is necessary to shift the pH towards acidity, an acid such as nitric acid, hydrochloric acid, sulfuric acid or acetic acid should be added.

As a result of forming secondary particles of a suitable size and aggregating those secondary particles, mesopores 3 having a pore diameter of 2-100 nm are formed between secondary particles 2, as shown in FIG. 1, and locations of a strong bonding state between primary particles 1 and locations of weak bonding between the secondary particles are present. Bonding is weak where the pores are large, and clefts widen easily from these locations during firing. On the other hand, as sintering proceeds due to high-temperature firing at locations where bonding is strong, pores having a small diameter are crushed while pores having a large diameter increase. As a result, there is little change in pore volume overall, while pores having a large diameter increase. In contrast, as composite oxides formed by conventional synthesis methods are composed of large secondary particles that are aggregates of primary particles, and the bonds between primary particles are nearly uniform, contact between primary particles increases and pore volume decreases due to high-temperature firing. This means that the volume of the secondary particles, which are aggregates of the primary particles, as well as pore volume decrease. In this manner, in a composite oxide obtained according to the method of the present invention, due to the presence of portions where bonding strength between primary particles differs, decreases in pore volume caused by sintering between primary particles as a result of high-temperature firing are inhibited, and as a result, decreases in characteristics are also inhibited.

On the other hand, if the size of secondary particles composed by aggregation by primary particles is 100 nm or larger, there are a large number of macropores of 100 nm or larger even between the secondary particles. In addition, if the cohesive force between primary particles is too strong, the resulting composite oxide is formed only from large secondary particles. Namely, although pores are present between the primary particles, only macropores are present between the secondary particles and there are hardly any mesopores. Thus, it is preferable to suppress aggregation of primary particles to a certain extent.

In order to suppress the aggregation of primary particles in this manner, after having formed the primary particles, together with physically forming spaces between the primary particles during aggregation to suppress collisions between primary particles, by also shifting the pH by 1-3 from the isoelectric point, secondary particles of about 30-100 nm are first formed, after which pores are formed between the secondary particles, by aggregating, by causing the pH to approach the isoelectric point.

In order to physically form these spaces between the primary particles, the volume of the oily phase relative to the aqueous phase is preferably increased to maintain an adequate distance between the water droplets, namely the reverse micelles. In a microemulsion containing reverse micelles, the size of the water droplets and distance between water droplets of the reverse micelles is determined by the three factors of the amount of water, the amount of oil and the amount of surfactant. Thus, secondary particles having a size of about 100 nm are formed by suitably adjusting the amounts of water, oil and surfactant. For example, the amount of oil is preferably made to be two times or more the amount of water in terms of volume ratio, and the amount of oil is preferably made to be five times or more the amount of surfactant in terms of volume ratio.

As has been described above, hydroxides (precursors) are typically formed when a hydrolysis reaction is carried out by contacting an organic phase and an aqueous phase. According to the present invention, a composite oxide is produced by drying the product and firing in any case. Conventional methods may be used for separating and drying the product. Firing conditions may be the same as those employed in the prior art, and the firing temperature, firing atmosphere and so forth should be selected according to the specific type of composite oxide. In general, however, firing can be carried out at a lower temperature as compared with the prior art. This is thought to be because, as the metal elements are uniformly dispersed in advance, less energy is required to disperse the metal elements in a solid.

A third aspect of the production method of a composite oxide of the present invention comprises: an aqueous solution containing ions of a first metal element and an aqueous solution containing ions of a second or other metal element are mixed and allowed to react in an aqueous phase within reverse micelles formed by surfactant in an organic solvent, a compound containing the first metal element and the second metal element is precipitated, this is then hydrolyzed to form primary particles of a precursor of a composite oxide by polycondensation, and in a system containing these primary particles, the primary particles are aggregated to form secondary particles, and the secondary particles are aggregated; wherein, the volume of the organic phase outside the reverse micelles and the volume of the aqueous phase inside the reverse micelles is increased relative to the volume of surfactant so that adequate pores are formed between the secondary particles while adequately maintaining the distance between the reverse micelles during hydrolysis.

In this method of the third aspect, the metal elements, surfactant and organic solvent used are the same as the method of the first aspect. In this method of the third aspect, the first metal element and the second or other metal element are both present as ions in an aqueous phase within reverse micelles, and form a composite oxide within this aqueous phase by so-called co-precipitation.

More specifically, after preparing, for example, a solution of a salt of a first metal element and a solution of a salt of a second metal element, a surfactant is dissolved in an organic solvent as in the method of the first aspect, followed by the addition of the solution of a salt of the first metal element and the solution of a salt of the second metal element to form two types of reverse micelles containing the respective metal element ions. Alternatively, two or more types of metal element ions are contained in a single reverse micelle. Separate from this, reverse micelles in which a precipitating agent is contained in an aqueous phase is similarly prepared using an aqueous solution containing a precipitating agent. Precipitating agents used in co-precipitation methods of the prior art can be used for the precipitating agent, examples of which include ammonia capable of neutralizing metal salts, ammonium carbonate, sodium hydroxide, potassium hydroxide, sodium carbonate and other bases and alcohols. Among these, ammonia and ammonium carbonate are particularly preferable since they are volatilized during subsequent firing, and the pH of this alkaline solution is preferably 9 or higher.

Reverse micelles containing ions of a first metal, reverse micelles containing ions of a second metal, or reverse micelles containing both ions of a first metal and ions of a second metal and reverse micelles containing a precipitating agent, as well as reverse micelles containing ions or a third or other metal as necessary, produced in this manner, are mixed and allowed to react within the aqueous phase of the reverse micelles. Next, by aging in the same manner as the method of the first aspect, a precursor of a composite oxide is formed. At this time, by adjusting the size of each reverse micelle and the distance between reverse micelles in the same manner as the method of the first aspect, a porous composite oxide can be obtained in which the aggregation of primary particles is suppressed in the resulting composite oxide, the size of the secondary particles formed is restricted, and mesopores are present between the secondary particles.

According to this method of the third aspect, although the dispersivity of the second metal element in the resulting composite oxide is slightly lower as compared with the method of the first aspect, aggregation of primary particles can be controlled in the same manner as the method of the first aspect, and a composite oxide can be obtained having similar pores.

In a fourth aspect of the production method of a composite oxide of the present invention, an aqueous solution containing a first metal element ion and an aqueous solution containing a second or other metal element ion are mixed and allowed to react, a compound containing the first metal element and second or other metal element is allowed to precipitate, this is then hydrolyzed to form primary particles of a precursor of a composite oxide by polycondensation, and in a system containing these primary particles, the primary particles are aggregated to form secondary particles, and the secondary particles are aggregated; wherein, a compound is precipitated by making the total metal element ion concentration in the mixture of the aqueous solution containing the first metal element ion and the aqueous solution containing the second or other metal element ion to be 0.3 mol/L or less, and secondary particles are subsequently aggregated by concentrating the solution containing this precipitate.

In this method of the fourth aspect, an aqueous solution containing a salt of a first metal and an aqueous solution containing a salt of a second metal are first prepared in the same manner as the method of the third aspect, these aqueous solutions are mixed, a precipitating agent is added and allowed to react, and a precursor of a composite oxide is formed. However, when mixing these solutions of the salts of two types of metals, each aqueous solution is mixed in the form of a dilute solution. The concentration of the metal salt solutions is 0.15 mol/L or less, and preferably 0.1 mol/L or less. As a result of mixing in dilute solutions such as these, collision of the primary particles formed is suppressed and aggregation can be suppressed so as not to form large secondary particles. Following the reaction, a solution containing a precipitate of primary particles is concentrated by, for example, spraying from a nozzle or passing through an osmotic membrane to allow aggregation to process thereby making it possible to obtain a composite oxide having mesopores.

EXAMPLES

Example 1

8.6 liters of cyclohexane and 350 g of polyethylene (n=5) nonylphenyl ether were placed in a beaker having an internal volume of 15 liters followed by the addition of an aqueous solution composed of 43 g of cerium nitrate and 120 mL of distilled water and stirring. Reverse micelles (water-in-oil microemulsion, water droplet measured diameter: 17 nm) were produced at room temperature by stirring using a magnetic stirrer. Separate from this procedure, a zirconium alkoxide solution was prepared in which 50 g of zirconium butoxide were dissolved in 0.8 liters of cyclohexane, and this was then added to the aforementioned microemulsion. The volume ratio of water (aqueous phase) to cyclohexane (organic phase) at this time was 78. When this mixture was stirred well at room temperature, the inside of the beaker immediately became cloudy and had a whitish-yellow color and colloidal particles (secondary particles, particle diameter: about 10 nm) were formed.

Next, the pH was adjusted to 8 with aqueous ammonia to regulate the aggregation of colloidal particles. Moreover, aging was carried out by continuing stirring for about 1 hour. After filtering out the mother liquor, washing the resulting precipitate three times with ethanol and drying overnight at 80° C., the precipitate was fired for 5 hours in air at 600° C., 900° C. and 1000° C. to obtain a composite oxide containing cerium and zirconium (ceria-zirconia). The Ce/Zr molar ratio of the composite oxide was 1/1.

Example 2

$SrZrO_3$ composite oxide was produced in basically the same manner as Example 1. Namely, 8.6 liters of cyclohexane and 350 g of polyethylene (n=5) nonylphenyl ether were placed in a beaker having an internal volume of 15 liters followed by the addition of an aqueous solution composed of 37 g of strontium nitrate and 100 mL of distilled water and stirring. Reverse micelles (water-in-oil microemulsion, water droplet measured diameter: 15 nm) were produced at room temperature by stirring using a magnetic stirrer. Separate from this procedure, a zirconium alkoxide solution was prepared in which 68 g of zirconium butoxide were dissolved in 0.8 liters of cyclohexane, and this was then added to the aforementioned microemulsion. The distance between reverse micelles at this time was about 22 nm. When this mixture was stirred well at room temperature, the inside of the beaker immediately became cloudy and had a whitish-yellow color and colloidal particles (particle diameter: about 10 nm) were formed.

Next, the pH was adjusted to 10.2 with aqueous ammonia to regulate the aggregation of colloidal particles. Moreover, aging was carried out by continuing stirring for about 1 hour. After filtering out the mother liquor, washing the resulting precipitate three times with ethanol and drying overnight at 80° C., the precipitate was fired for 5 hours in air at 600° C., 900° C. and 1000° C. to obtain a composite oxide containing strontium and zirconium (strontium-zirconia). The resulting powder was analyzed by Raman scattering and X-ray diffraction, and the crystal form was confirmed to be perovskite.

Example 3

8.6 liters of cyclohexane and 350 g of polyethylene (n=5) nonylphenyl ether were placed in a beaker having an internal volume of 15 liters followed by the addition of an aqueous solution composed of 42.5 g of cerium nitrate, 30.1 g of zirconium nitrate and 120 mL of distilled water and stirring. Reverse micelles were produced at room temperature by stirring using a magnetic stirrer. Next, the reverse micelles were dropped into a reverse micelle solution containing ammonium in the aqueous phase and stirring was continued to form colloidal particles. Continuing, the colloidal particles were aggregated in the same manner as Example 1 to obtain a composite oxide containing cerium and zirconium (ceria-zirconia).

Example 4

10 liters of an aqueous solution in which cerium nitrate and zirconium nitrate were dissolved to concentrations of 0.025 mol/L each were added to a beaker having an internal volume of 15 liters followed by dropping in an equal amount of aqueous ammonia relative to the nitrate ions to neutralize the solution and form colloidal particles. Continuing, the solution containing these colloidal particles was sprayed into dry air until the liquid volume was reduced by half. Subsequently, the pH was adjusted to about 8 by dropping ammonia into the solution to obtain an aggregate. This was then filtered, dried overnight at 80° C., and fired at the prescribed concentration to obtain a composite oxide containing cerium and zirconium (ceria-zirconia).

Example 5

8.6 liters of cyclohexane and 350 g of polyethylene (n=5) nonylphenyl ether were placed in a beaker having an internal volume of 15 liters and stirred well. 120 mL of an aqueous solution in which 19 g of cerium nitrate were dissolved were added to this followed by stirring well at room temperature. As a result, reverse micelles (water-in-oil microemulsion, water particle diameter: 15 nm) were formed. Separate from this procedure, a zirconium alkoxide solution was produced in which 0.23 moles of zirconium-n-butoxide were dissolved in 0.8 liters of cyclohexane, and this solution was then added to the aforementioned microemulsion while simultaneously adjusting the pH to 4.5 with aqueous ammonia. At this time, the contents of the beaker immediately became cloudy and had a white color and there was slight aggregation of colloidal particles (about 10 nm) (secondary particles).

Next, the pH was adjusted to 8.1 by adding aqueous ammonia to regulate the aggregation of colloidal particles. Moreover, aging was carried out by continuing stirring for about 1 hour. After filtering out the mother liquor, washing the resulting precipitate three times with ethanol and drying overnight at 80° C., the precipitate was fired in air at 600° C. to obtain $CeO_{0.2}Zr_{0.8}O_2$ composite oxide.

Example 6

This example was carried out in basically the same manner as Example 1 with the exception of using lanthanum nitrate instead of cerium nitrate. Namely, 8.6 liters of cyclohexane and 350 g of polyethylene (n=5) nonylphenyl ether were placed in a beaker having an internal volume of 15 liters and stirred well. 120 mL of an aqueous solution in which 0.058 moles of lanthanum nitrate were dissolved were added to this followed by stirring well at room temperature. As a result, reverse micelles (water-in-oil microemulsion, water particle diameter: 15 nm) were formed. Separate from this procedure, a zirconium alkoxide solution was produced in which 0.23 moles of zirconium-n-butoxide were dissolved in 0.8 liters of cyclohexane, and this solution was then added to the aforementioned microemulsion while simultaneously adjusting the pH to 6.0 with aqueous ammonia. At this time, the contents of the beaker immediately became cloudy and had a white color and there was slight aggregation of colloidal particles (about 10 nm) (secondary particles). Next, the pH was adjusted to 8.9 by adding aqueous ammonia to regulate the aggregation of colloidal particles. Moreover, aging was carried out by continuing stirring for about 1 hour. After filtering out the mother liquor, washing the resulting precipitate three times with ethanol and drying overnight at 80° C., the precipitate was fired in air at 600° C. to obtain $La_{0.2}Zr_{0.8}O_{1.9}$ composite oxide.

Comparative Example 1

Cerium nitrate and zirconium nitrate were added to 2 liters of distilled water to concentrations of 0.5 mol/L each and dissolved. The pH of this aqueous solution was adjusted to 9 by dropping in aqueous ammonia to obtain a precipitate. This precipitate was then filtered out and dried followed by firing at 600° C.

Comparative Example 2

A non-ionic surfactant (polyoxyethylene octylphenyl ether) was added to 2 liters of distilled water without foaming. Subsequently, cerium nitrate and zirconium nitrate were added to this to concentrations of 0.5 mol/L each and dissolved. The pH of this aqueous solution was adjusted to 9 by dropping in aqueous ammonia to obtain a precipitate. This was then washed with water, filtered and dried followed by firing at 600° C.

Comparative Example 3

8.6 liters of cyclohexane and 350 g of polyethylene (n=5) nonylphenyl ether were placed in a beaker having an internal volume of 15 liters and stirred well. 120 mL of an aqueous solution in which 19 g of cerium nitrate were dissolved were added to this followed by stirring well at room temperature. As a result, reverse micelles (water-in-oil microemulsion, water particle diameter: 15 nm) were formed. Separate from this procedure, a zirconium alkoxide solution was produced in which 0.23 moles of zirconium-n-butoxide were dissolved in 0.8 liters of cyclohexane, and this solution was then added to the aforementioned microemulsion. Next, the pH was adjusted to 8.1 by adding aqueous ammonia. Moreover, aging was carried out by continuing stirring for about 1 hour. After filtering out the mother liquor, washing the resulting precipitate three times with ethanol and drying overnight at 80° C., the precipitate was fired in air at 600° C. to obtain $Ce_{0.2}Zr_{0.8}O_2$ composite oxide.

Comparative Example 4

This comparative example was carried out in the same manner as Comparative Example 1 with the exception of using lanthanum nitrate instead of cerium nitrate. Namely, 8.6 liters of cyclohexane and 350 g of polyethylene (n=5) nonylphenyl ether were placed in a beaker having an internal volume of 15 liters and stirred well. 120 mL of an aqueous solution in which 0.048 moles of lanthanum nitrate were dissolved were added to this followed by stirring well at room temperature. As a result, reverse micelles (water-in-oil microemulsion, water particle diameter: 15 nm) were formed. Separate from this procedure, a zirconium alkoxide solution was produced in which 0.23 moles of zirconium-n-butoxide were dissolved in 0.8 liters of cyclohexane, and this solution was then added to the aforementioned microemulsion. Next, the pH was adjusted to 8.9 by adding aqueous ammonia. Moreover, aging was carried out by continuing stirring for about 1 hour. After filtering out the mother liquor, washing the resulting precipitate three times with ethanol and drying overnight at 80° C., the precipitate was fired in air at 600° C. to obtain $La_{0.2}Zr_{0.8}O_{1.9}$ composite oxide.

Performance Evaluation

Figure 6:
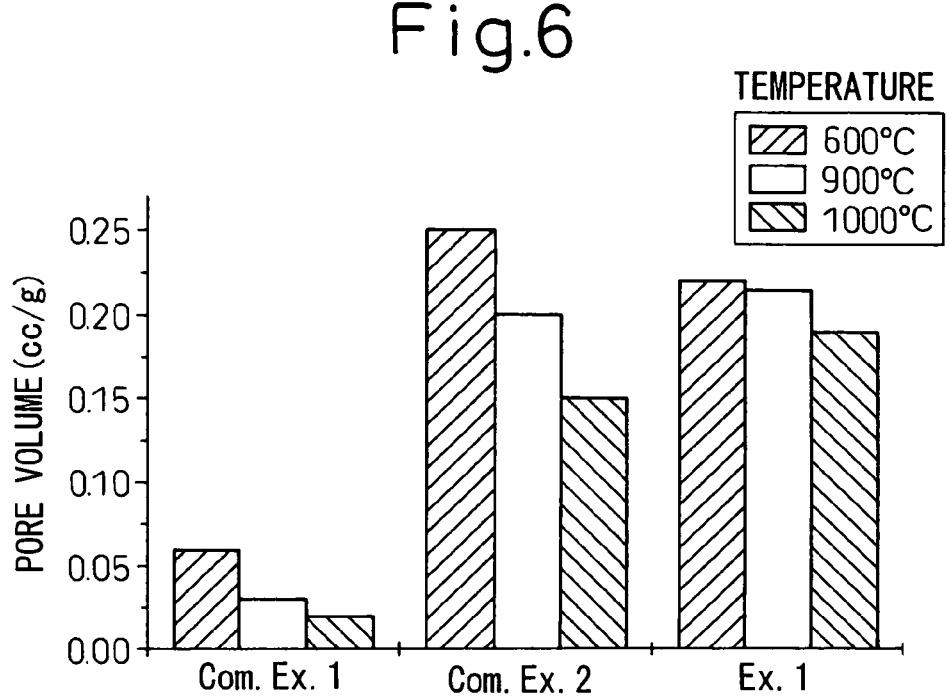
FIG. 6 is a graph showing the changes in pore volume during firing of various types of cerium-zirconium composite oxides.

Pore volume after firing at 600° C., 900° C. and 1000° C. was measured for the resulting porous composite oxides by nitrogen adsorption at the temperature of liquid nitrogen. These results are shown in FIG. 6. In addition, pore distribution after firing at 600° C. and 900° C. was similarly measured for the resulting porous composite oxides by nitrogen absorption. Those results are shown in FIG. 7.

Figure 7:
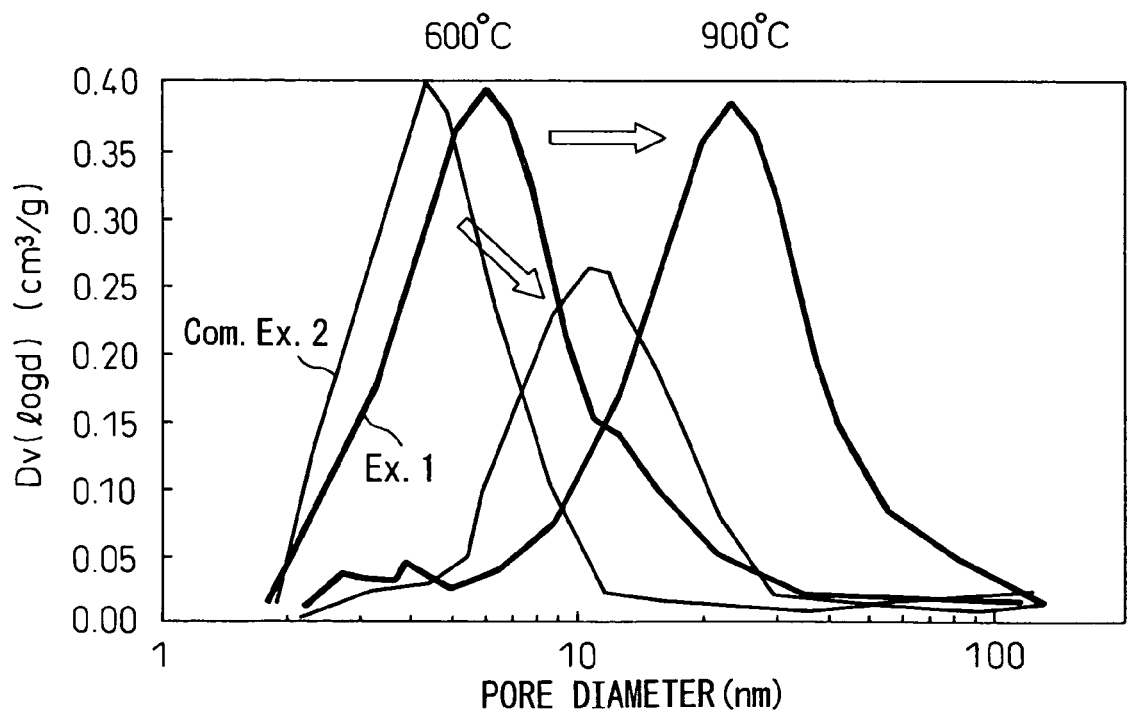
FIG. 7 is a graph showing the changes in pore diameter distribution after firing various types of cerium-zirconium composite oxides at 600° C. and 900° C.

As is clear from the results shown in FIGS. 6 and 7, although pore volume decreases considerably or the peak of pore distribution shifts towards the high side when composite metal oxides of the prior art are fired at a high temperature, the peak values were shown to decrease and pore volume was also shown to decrease. In contrast, in the case of the composite metal oxides of the present invention, there were no decreases in pore volume, pore distribution shifted only towards higher peak values, and there were hardly any changes in peak height or pore volume even when fired at high temperatures.

Ceria-zirconia is known to exhibit have a high oxygen storage capacity when Ce is substituted with high dispersivity in the Zr lattice (Catal. Today, 74, 225-234 (2002), Y. Nagai et al.). Therefore, the amount of substitution can be predicted by measuring the amount of oxygen storage. The amount of oxygen storage is especially affected at low temperatures (300° C. or lower). Here, the amount of oxygen storage can be expressed as the oxidation and reduction of Ce as shown below.

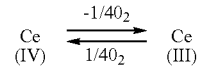

The oxygen storage capacity of the ceria-zirconia obtained in the aforementioned Example 1 and Comparative Examples 1 and 2 was evaluated using the oxygen pulse adsorption method. The utilization rate of cerium was then calculated from the resulting oxygen storage capacity, and the results are shown in FIG. 8 based on a Ce utilization rate of 100% for the case of $Ce(IV)O_2 \rightarrow Ce(III)O_{1.5} + 1/2 O_2$.

Figure 8:
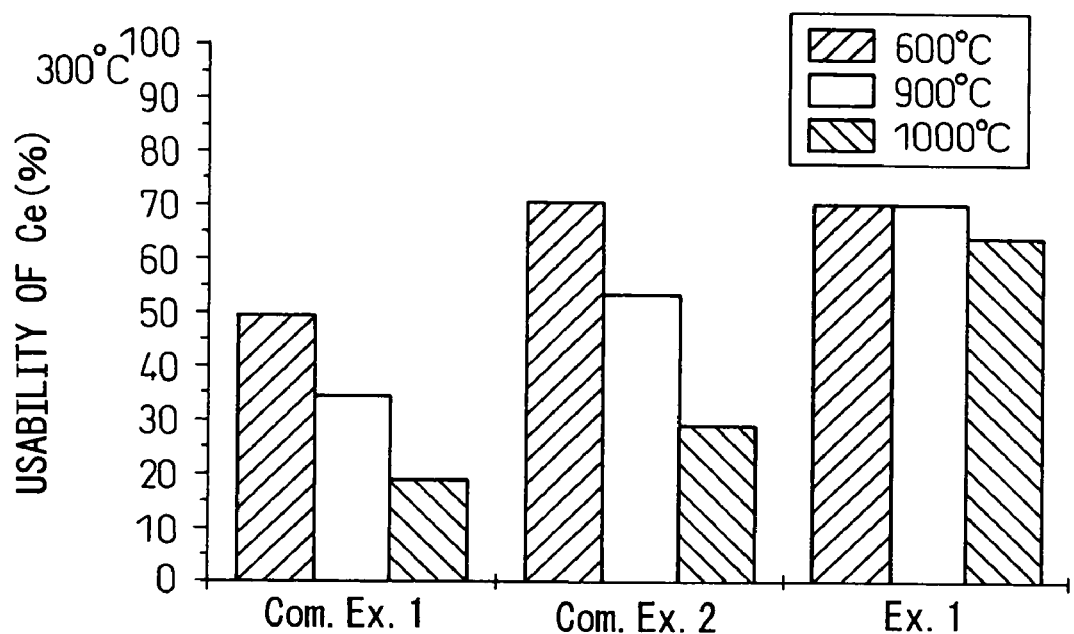
FIG. 8 is a graph showing the changes in the amount of occluded oxygen of various types of cerium-zirconium composite oxides.

As shown in FIG. 8, according to the present invention, a large Ce utilization rate was obtained even after high-temperature firing, and this indicates that high dispersivity of Zr and Ce was achieved from the time of composite oxide synthesis.

The oxygen storage capacity at 300° C. of the ceria-zirconia obtained in the aforementioned Example 5 and Comparative Example 3 was evaluated using the oxygen pulse adsorption method. The utilization rate of cerium was calculated from the resulting oxygen storage capacity, and those results are shown in FIG. 9.

Figure 9:
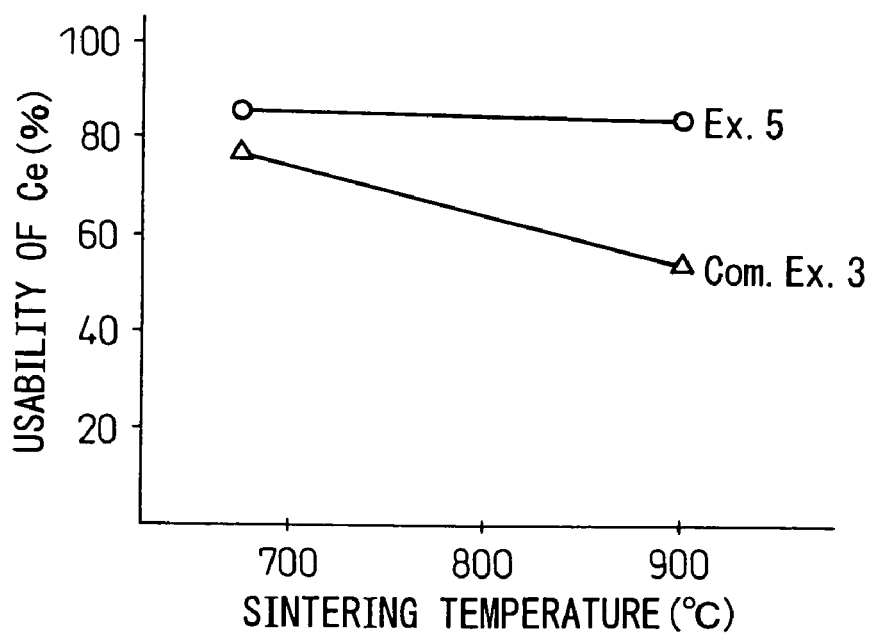
FIG. 9 is a graph comparing the oxygen occlusion capacity of ceria-zirconia produced in an example and comparative example.

As shown in FIG. 9, according to the present invention, a large Ce utilization rate was obtained even after high-temperature firing. On the other hand, the Ce utilization rate was considerably lower after high-temperature firing at 900° C. in the case of Comparative Example 3.

The surface area was measured for the synthesis products of Example 6 and Comparative Example 4. Those results are shown in FIG. 10.

Figure 10:
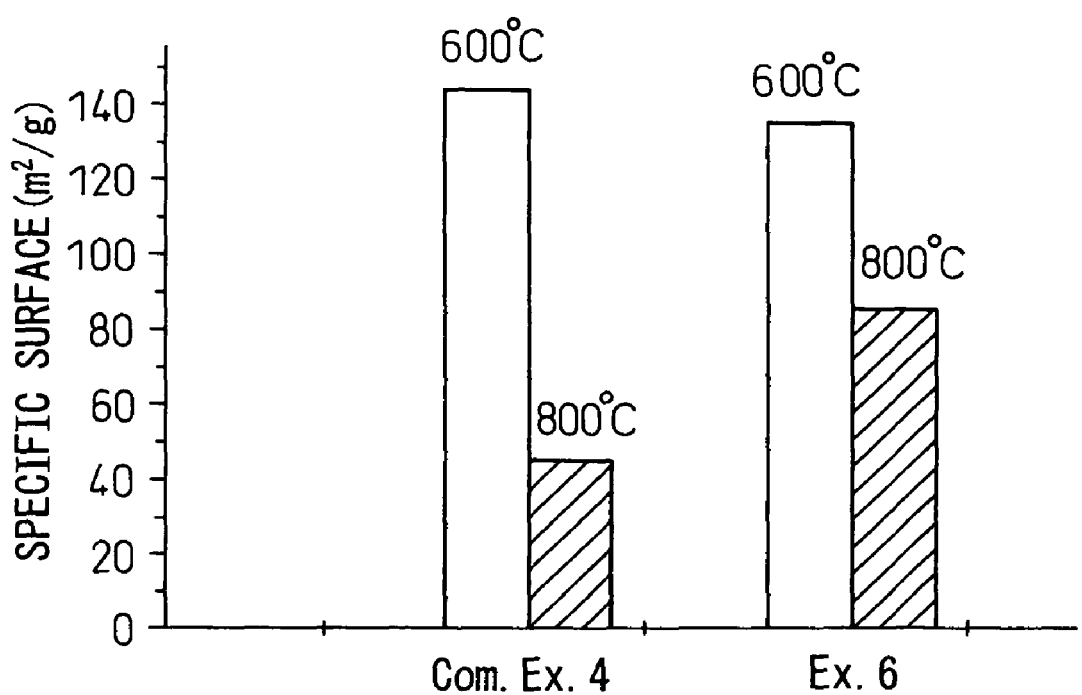
FIG. 10 is a graph comparing the specific surface area of lanthanum-zirconia produced in an example and comparative example.

As is shown in FIG. 10, although the specific surface area decreased considerably following high-temperature firing in the case of Comparative Example 4, the decrease in surface area was suppressed in the case of the present invention.

As has been described above, the ceria-zirconia of the present invention was clearly determined to be usable as a catalyst raw material having a high level of low-temperature activity unlike that found in the prior art.

Moreover, a composite metal oxide of the present invention is useful as a purification catalyst for diesel exhaust gas in particular. In the case of diesel fuel, light oil is added to the exhaust system as an HC source in order to reduce NOx. However, due to the large molecular weight of this light oil component, even if it is vaporized, it cannot be adequately dispersed in composite metal oxides of the prior art, and as this dispersion becomes the rate-determining step, the reaction does not proceed. However, in the case of a composite metal oxide of the present invention, as this composite metal oxide has adequate pores of 2 nm or larger, the light oil component can also be dispersed therein, thereby making it possible to achieve adequate purification.

The invention claimed is:

1. A method for producing a porous composite metal oxide, the method comprising:
   (a) mixing (i) a solution comprising a first metal element in an organic solvent with (ii) an emulsion comprising one or more second metal element in an aqueous phase within reverse micelles formed by a surfactant and an organic phase, the first metal element being one of zirconium and cerium and the second metal element being the other of zirconium and cerium;
   (b) hydrolyzing the first metal element at an interface of the reverse micelles and incorporating the second metal element with the first metal element being hydrolyzed;
   (c) forming primary particles of a precursor of the composite oxide by polycondensation;
   (d) aggregating the primary particles to form secondary particles in a system containing the primary particles; and
   (e) aggregating the secondary particles;
   wherein a volume of the organic phase outside the reverse micelles is larger than a volume of the aqueous phase inside the reverse micelles and a volume of the surfactant.

2. The method according to claim 1, wherein the volume of the organic phase outside the reverse micelles is two or more times larger than the volume of the aqueous phase inside the reverse micelles.

3. The method according to claim 1, wherein the volume of the organic phase outside the reverse micelles is 5 or more times larger than the volume of the surfactant.

4. The method according to claim 1, wherein a diameter of the aqueous phase inside the reverse micelles is 5 nm or more, and a distance between the reverse micelles is 20 nm or more.

5. The method according to claim 1, wherein, in step (c), the pH is adjusted to determine the size of the secondary particles.

6. The method according to claim 5, wherein the pH is shifted from an isoelectric point by 1 to 3.

7. The method according to claim 5, wherein a diameter of the aqueous phase of the reverse micelles is 2-40 nm and a distance between the reverse micelles is 20 nm or more.

8. The method according to claim 5, wherein the first metal element is provided to the solution of step (a) as a metal alkoxide or acetonato metal complex, and the second metal element is provided to the emulsion of step (a) as an inorganic acid metal salt.

9. A method of producing a porous composite metal oxide, the method comprising:
   (a) mixing (i) an aqueous solution comprising a first metal element and one or more second metal element with (ii) an organic solvent comprising a surfactant to react the first and second metal elements in an aqueous phase inside reverse micelles formed by the surfactant, the first metal element being one of zirconium and cerium and the second metal element being the other of zirconium and cerium;
   (b) precipitating a compound comprising the first and second metal elements;
   (c) hydrolyzing the compound to form primary particles of a precursor of a composite metal oxide by polycondensation;
   (d) aggregating the primary particles to form secondary particles in a system containing the primary particles; and
   (e) aggregating the secondary particles;
   wherein a volume of an organic phase outside the reverse micelles is larger than a volume of the aqueous phase inside the reverse micelles and a volume of the surfactant.

10. The method according to claim 9, wherein the volume of the organic phase outside the reverse micelles is two or more times larger than the volume of the aqueous phase inside the reverse micelles.

11. The method according to claim 9, wherein the volume of the organic phase outside the reverse micelles is five or more times larger than the volume of the surfactant.

12. The method according to claim 9, wherein a diameter of the aqueous phase inside the reverse micelles is 5 nm or more, and a distance between the reverse micelles is 20 nm or more.

13. The method according to claim 1, wherein the first metal element is zirconium and the second metal element is cerium.

14. The method according to claim 9, wherein the first metal element is zirconium and the second metal element is cerium.

* * * * *